(12) United States Patent
Wolter et al.

(10) Patent No.: US 6,426,795 B1
(45) Date of Patent: Jul. 30, 2002

(54) DEVICE FOR ACQUIRING MECHANICAL VARIABLES BY EVALUATING THE SUPERPOSITION OF OSCILLATIONS

(76) Inventors: Klaus Wolter, Friedrich-Wilhelm-Str. 32, D-40625 Düsseldorf; Lothar Schwan, Weissenstein 67, D-40764 Langenfeld, both of (DE)

( * ) Notice: Subject to any disclaimer, the term of this patent is extended or adjusted under 35 U.S.C. 154(b) by 0 days.

(21) Appl. No.: 09/242,231

(22) PCT Filed: Aug. 6, 1997

(86) PCT No.: PCT/EP97/04288

§ 371 (c)(1),
(2), (4) Date: Feb. 5, 1999

(87) PCT Pub. No.: WO98/05972

PCT Pub. Date: Feb. 12, 1998

(30) Foreign Application Priority Data

Aug. 7, 1996 (DE) .......................... 196 31 781

(51) Int. Cl.[7] .................................. G01C 19/64
(52) U.S. Cl. ....................................... 356/461
(58) Field of Search ................. 356/459, 460, 356/461, 462, 464, 465, 470, 472

(56) References Cited

U.S. PATENT DOCUMENTS

| | | | | |
|---|---|---|---|---|
| 3,600,095 A | * | 8/1971 | Tanaka ........................ 356/459 |
| 4,120,587 A | * | 10/1978 | Vali et al. .................... 356/461 |
| 4,135,822 A | * | 1/1979 | Ezekiel ........................ 356/461 |
| 4,521,110 A | * | 6/1985 | Roberts et al. ............. 356/459 |
| 4,647,204 A | * | 3/1987 | Honeycutt et al. .......... 356/459 |
| 5,022,761 A | * | 6/1991 | Kennedy ..................... 356/459 |
| 5,351,261 A | | 9/1994 | Lanzerotti et al. |
| 5,650,850 A | * | 7/1997 | Deils et al. .................. 356/459 |

FOREIGN PATENT DOCUMENTS

| | | |
|---|---|---|
| DE | 31 10 041 A | 9/1982 |
| EP | 0 059 644 A | 9/1982 |
| EP | 0 078 931 A | 5/1983 |
| EP | 0 533 390 A | 3/1993 |

* cited by examiner

*Primary Examiner*—Samuel A. Turner
(74) *Attorney, Agent, or Firm*—Proskauer Rose LLP

(57) ABSTRACT

A device for acquiring mechanical variables, namely, angles of rotation, speeds, angular velocities or angular accelerations, comprises at least one fiberglass ring having an elliptical cross section, at least one coupler and decoupler associated with the fiberglass ring, a laser connected to the coupler, and a measuring location connected with the decoupler. The fiberglass ring forms at least two propagation paths wherein the oscillations from the laser rotate in opposite directions. The decoupler decouples the oscillations which are superposed at the measuring location where an evaluation signal is detected.

7 Claims, 2 Drawing Sheets

A - A'

DEVICE FOR ACQUIRING MECHANICAL VARIABLES BY EVALUATING THE SUPERPOSITION OF OSCILLATIONS

BACKGROUND OF THE INVENTION

The invention relates to a device for acquiring mechanical variables, specifically angles of rotation, speeds, angular velocities or angular accelerations, by evaluating the superposition of at least two oppositely propagating oscillations of a physical, in particular optical, variable inertial to the examined rotation.

Devices of this kind are described in Patent Applications EP 0 078 931 A1, DE 31 10 041 A1 and EP 0 059 644 A1. In the cited publications, an oscillation source for outputting oscillations is provided for a device used to acquire rotation variables of a system. The oscillations output by this single source generate at least two physically coupled oscillations, which propagate outwardly along two open paths in opposite directions relative to the system rotation. The oscillations each pass through the propagation path exactly one time before they are decoupled again. The respective variables are subsequently determined by evaluating the differences in propagation times of the opposite oscillations that arise from the system rotation.

Also known in the art are so-called laser gyroscopes. These are highly precise devices that remain stable over a relatively long time. Such laser gyroscopes use the constant propagation velocity (light speed) of an electromagnetic oscillation as the physical variable. The oscillation propagates in an opposite direction along a closed path, so that a standing wave comes about. The oscillations are inertial to the reference system relative to which the system established by the device rotates, meaning t hat they are not coupled to the reference system. This makes it possible to observe and evaluate a useful signal generated by the interference between the opposed, superposed wave trains from an observation area which is in turn coupled with the rotating system.

However, one problem during the use of laser gyroscopes involves the so-called lock-in effect, which makes it impossible to employ these devices for low rates of rotation. In a conventional laser gyroscope, such a lock-in effect comes about due to irregularities on the propagation path. Such irregularities trigger undesired additional reflections of the rotating waves, which locks in the phase positions of the waves rotating in opposite directions, since wave trains with small losses are always preferred. Therefore, no conclusion as to the variables to be determined can be made by evaluating the useful signal. Such an "adjustment" is associated with a relatively high time constant, so that this lock-in effect comes to bear primarily at low rates of rotation.

To avoid this effect, it has been proposed that a base rotation be imposed at rates of rotation in time intervals below the adjustment time (Dither method, rate-bias method). DE 32 24 229 describes an annular laser that can be used as a gyroscope, in which an attempt is made to offset the lock-in effect via the vibration of electrons around the center of gravity of a three-sided block exhibited by the annular laser.

On the other hand, DE 32 22 035 proposes that magnetooptic bias elements (magnetic mirrors) be used in order to achieve controllable frequency differences.

However, both methods require active elements in the annular laser, which result in a, to some extent partial, base rotation of the system, thereby circumventing the lock-in effect.

Patent Specification U.S. Pat. No. 4,135,822 describes another sensor for measuring inertial rotation. Two laser sources or a single laser source in the sensor generate two light beams with a separately adjustable frequency. The generated light beams are coupled into a closed propagation path in opposite directions. They are subsequently decoupled again, and one photodetector is used to generate electrical signals proportional to the frequencies of the light beams. These electrical signals are used to continuously adjust the frequencies of the generated light beams to the frequency of the respective accompanying decoupled light beam. The light beams generated in this controlled manner continue to be coupled into the propagation path, and are also compared and evaluated with respect to their frequency. Therefore, a complicated readjustment is here necessary to obtain the measured variables desired for the evaluation.

The object of the invention is to provide a device that makes it possible to easily acquire physical variables that are highly precise and exhibit high long-term stability for use in determining angles of rotation, speeds, angular velocities and angular accelerations, which also enables the acquisition of low rates of rotation for an object without hardware accessories by incorporating active elements in the annular laser.

SUMMARY OF THE INVENTION

This object is achieved according to the invention by a device for acquiring mechanical variables, specifically angles of rotation, speeds, angular velocities or angular accelerations, by evaluating the superposition of at least two oscillations, physically decoupled in pairs, of a physical, in particular optical, variable inertial to the examined rotation, wherein the oscillations propagate along closed propagation paths formed by annular lasers/masers, the oscillations rotate in opposite directions in a projection of the propagation path on a plane that exhibits precisely one point of intersection with the rotational axis (D) of the system, and the at least two oscillations propagating along the propagation paths can each be decoupled in pairs on decoupling segments (K2, K4) and only become superposable outside the propagation paths at a measuring location (M) where the evaluation signal obtained from superposing the oscillations is detectable.

The interferences associated with the superposed oscillations are evaluated in the manner usual in the art. The advantage to the device according to the invention is that it avoids a lock-in effect from the very outset. As a result of using two separate propagation paths, the two wave trains, which each rotate inertially and in opposite directions relative to the rotational axis, and give rise to the interference in known systems as the result of interference, exhibit no physical interaction with the device from the very outset, so that irregularities can exert no influence. In addition, superposing the signal outside the propagation path ensures that signal observation will have no impact on the active system.

The subclaims describe preferred embodiments of the invention.

In one preferred embodiment of the invention, the physical variable is an optical variable, wherein the at least two propagation paths have the same optical path length, and oscillations of the same frequency propagate along the at least two propagation paths in the idle state.

In a first alternative, the propagation paths can be physically decoupled by spatially separating the at least two propagation paths from each other.

In a second alternative, the at least two propagation paths are separated from each other by using varying polarizations for the oscillations of the physical variable.

In addition, a preferred embodiment of the invention provides for an annular laser/maser with at least two superposed or contiguous similar, closed propagation paths with oscillations of the same frequency and a rotational path of identical length relative to the natural oscillation, and for a component with a non-isotropic transparency to sufficiently suppress one of the two directions of propagation for the natural oscillations on each of the closed propagation paths in order to achieve an opposite direction of propagation for the natural oscillations around a rotational axis on the two closed propagation paths. This embodiment of the device according to the invention is based on standard components in the known laser gyroscopes.

One alternatively preferred embodiment of the invention is characterized by the fact that the at least two propagation paths are formed in the device by optical conductors, in particular by fiberglass rings.

The device then preferably encompasses two laser-compatible, identical fiberglass rings for achieving the propagation paths, a simple optical coupler for each fiberglass ring, which does not serve as an isotropic medium and runs asymmetrically in the branches of the laser, in order to suppress one respective direction of propagation of the laser and couple the pump energy, and one other coupler to decouple the respective signal. The advantage to such a device is that it can easily establish two spatially separated propagation paths, between which any disrupting interaction can be precluded.

In another preferred embodiment, such a device can also exhibit fiberglass rings with an elliptical cross section that permit the use of mutually orthogonal polarizations for the oscillations of the optical variable. Using various polarizations for the oscillations makes it possible to provide two propagation paths decoupled from each other in a single fiberglass ring.

Also provided as a preferred embodiment of the invention is an integrated circuit, which encompasses the actively lasing optical waveguides, the couplers along with the controlling and evaluating electronics. A very small and highly precise measuring device can be set up in this way.

Another preferred embodiment comprises a rotor, which encompasses the fiberglass rings and couplers, and a stator, which encompasses the remaining components of the device. This makes it possible to accommodate a highly precise device in one axis.

In another alternative preferred embodiment of the invention, the laser mode that generates the active useful signal is executed in the boundary area of a circular disk, in particular an erbium circular disk. This yields a so-called "whispering-mode laser".

Finally, in another preferred embodiment, the device according to the invention consists of a rotor, which encompasses the circular disk and couplers, and a stator, which encompasses the remaining components of the device. Here as well, the advantage is that a highly precise device can be accommodated in one axis.

The invention also offers additional advantages from the following standpoints:

The device is an arrangement in which at least one physical variable can propagate and exist inertially, meaning not coupled to the system of the device and disturbed only to a minor extent by the device.

The device is characterized by the fact that the potential propagations for at least one such physical variable encompass self-contained paths.

The device is characterized by the fact that, on at least two such propagation paths, the propagation of at least one such physical variable in one of the two rotational directions of the propagation path can be sufficiently suppressed.

The invention is characterized by the fact that it exhibits at least two such propagation paths, on which the useful signal is not influenced by any interaction with the path. (These paths need not be spatially separated from each other, e.g., if varying polarizations are used.)

The invention is characterized by the fact that, for at least two such propagation paths, one projection exists on a two-dimensional plane, wherein the surfaces enveloped by the projections each exhibit a measure different than zero. One line that shares only one point with this plane is one rotational axis of the device.

The invention is characterized by the fact that, for at least two such propagation paths, there is at least one location at which the used physical variables can be observed.

The invention is characterized by the fact that the useable physical variable can be observed via an oscillation measurable by the device from the physically known spectrum.

The invention is characterized by the fact that oscillations of the same frequency can propagate on at least two such propagation paths in an idle state.

The invention is characterized by the fact that at least two such propagation paths have the same optical path length.

The invention is characterized by the fact that the oscillations rotate in opposite directions relative to the rotational axis on at least two such propagation paths.

The invention is characterized by the fact that the observable oscillations are superposed at a measuring location and evaluated according to the requirements.

BRIEF DESCRIPTION OF THE DRAWINGS

In the following, the invention will be illustrated in greater detail based on drawings. Shown on:

In a first embodiment, FIG. 1 shows two mirror symmetrical fiberglass rings G1 and G2, which lie opposite each other, as well as rotational axis D, around which the system rotates. Fiberglass ring s G1 and G2 each exhibit two couplers, of which one (K1 or K3) performs a coupling function, and a second (K2 or K4) performs a decoupling function. Couplers K1 and K3 are each connected with a pump laser L1 and L2, and decouplers K2 and K4 are each connected with a measuring location M. The couplers K1 and K3 additionally exhibit a non-isotropic transparency, i.e., the permeability to laser light measures approx. 95% in the conducting direction, and approx. 5% in the opposite direction.

The device operates as follows:

Pump energy is coupled into the fiberglass rings G1 ad G2 via pump lasers L1 and L2 and couplers K1 and K3, so that electromagnetic oscillations are generated and maintained on a closed path in fiberglass rings G1 and G2. The non-isotropic transparency of couplers K1 and K3 ensures that the oscillations can each propagate in only one direction, wherein the oscillations must propagate in opposite directions in the two fiberglass rings. In the example given in FIG. 1, the oscillation in fiberglass ring G1 propagates clockwise, while the oscillation in fiberglass ring G2 propagates counterclockwise.

Part of the oscillations (5% in the example) is decoupled from the two closed propagation paths of fiberglass rings GC and G2 via couplers K2 and K4, routed to the measuring location (M) and there superposed. Since oscillations of the same frequency propagate in the idle state on the two propagation paths, and since the propagation paths have the same optical path length as indicated for the mirror symmetry of the fiberglass rings in FIG. 1, superposing the two oscillations yields the same evaluation signal as for a device with a shared propagation path without any disturbances. In other words, the interferences can subsequently be evaluated in a known manner.

However, given the two independent propagation paths for the oscillations, an irregularity can obviously not cause the phase positions of the waves rotating in opposite directions to become locked in, thus avoiding a "lock-in" effect.

The embodiment with fiberglass rings lying opposite each other was selected to provide a clear representation. Two fiberglass rings arranged one on top of the other or in any other manner desired are just as conceivable. The only important factor is that the oscillations be able to propagate in opposite directions relative to the rotational axis in the rings.

Figure 2:
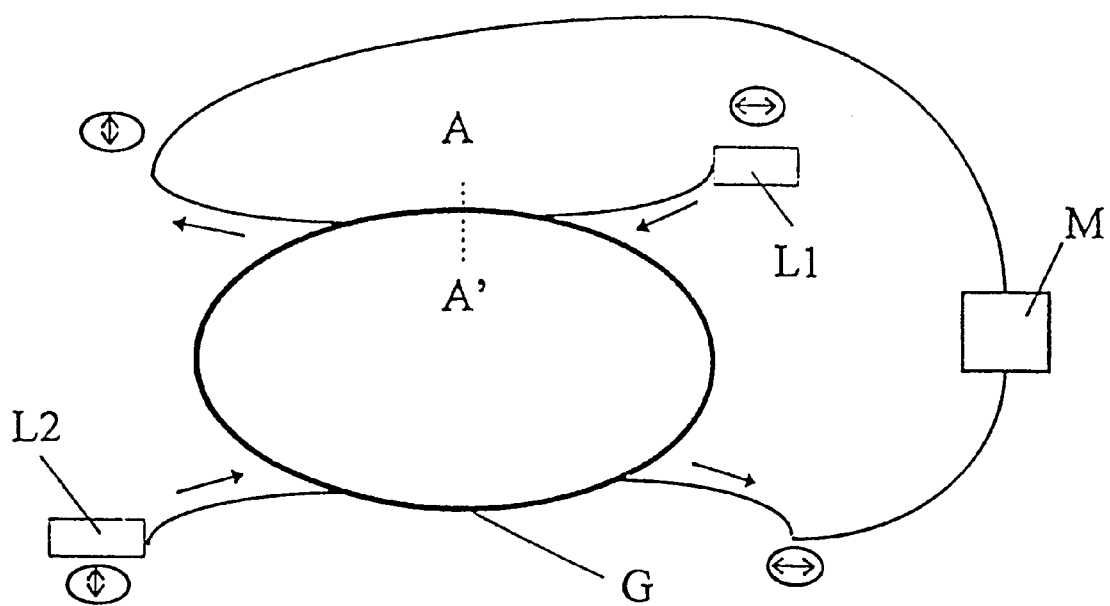
FIG. 2 is a second embodiment according to the invention with propagation paths separated by varying polarization in a shared fiberglass ring.
Figure 2:
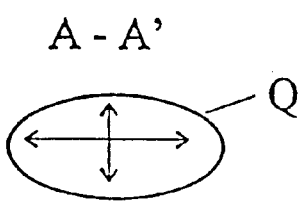

FIG. 2 shows an additional embodiment with only one fiberglass ring G. Couplers (not shown) provide two coupling connections of pump lasers L1 and L2, while other couplers (also not shown) provide two decoupling connections to a measuring location M. Fiberglass ring G exhibits an oval cross section Q, as evident from section A–A'.

Figure 1:
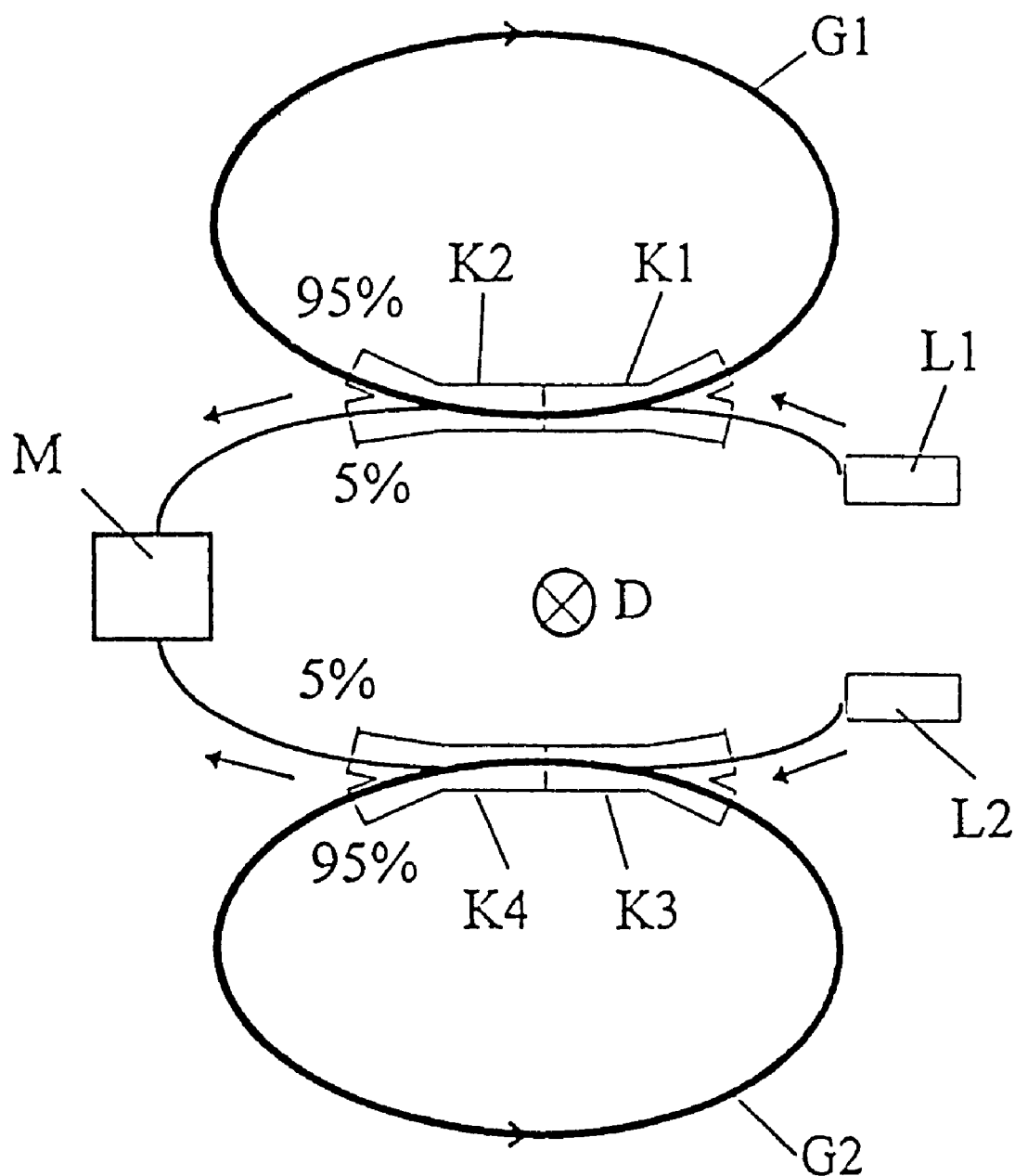
FIG. 1 is a first embodiment according to the invention with two spatially separated propagation paths in two fiberglass rings.

The second example works in essentially the same way as the first. The difference with respect to the example in FIG. 1 is that a single fiberglass ring is here used for the two propagation paths of the oscillations, which are to proceed in opposite directions and decoupled from each other. The two propagation paths are separated in the invention via two varying, mutually orthogonal polarizations of the two decoupled oscillations, as depicted in cross section Q. In the example for FIG. 2, the counterclockwise rotating oscillation coupled in via pump laser L1 exhibits a polarization in the transverse direction of the elliptical fiberglass cross section, while the clockwise rotating second oscillation coupled in via pump laser L2 exhibits a polarization in the longitudinal direction of the elliptical fiberglass cross section. In this case, the polarizations must be harmonized before superposing takes place at measuring location M. Subsequently, the interference effects are superposed and evaluated again in a known manner.

Given the varying polarizations, the propagation paths of the oppositely rotating oscillations are decoupled from each other, just as in the example for FIG. 1, so that irregularities cannot lock in the phase positions of the oppositely rotating waves here either, thus avoiding the "lock-in" effect.

What is claimed is:

1. A device for acquiring mechanical variables, including at least one of angles of rotation, speeds, angular velocities and angular accelerations, by evaluating the superposition of at least two oscillations, physically decoupled in pairs, of an optical variable inertial to the examined rotation, comprises:

at least one fiberglass ring having an elliptical cross section, at least one coupler associated with the at least one fiberglass ring, at least one laser/maser connected to the at least one coupler, at least one decoupler associated with the at least one fiberglass ring, and a measuring location connected to the at least one decoupler, wherein the oscillations propagate along at least two closed propagation paths formed by the at least one fiberglass ring, wherein the oscillations rotate in opposite directions from each other, wherein the elliptical cross section of the at least one fiberglass ring permits use of mutually orthogonal polarizations for the oscillations of the optical variable, and wherein the at least one decoupler decouples the oscillations propagating along the at least two propagation paths, the decoupled oscillations only becoming superposable outside the propagation paths at the measuring location where an evaluation signal obtained from superposing the oscillations is detected.

2. The device according to claim 1 wherein oscillations of a same frequency propagate on the at least two propagation paths in an idle state.

3. The device according to claim 1, further comprises an integrated circuit encompassing the at least one fiberglass ring, the at least one coupler, and controlling and evaluating electronics.

4. The device according to claim 1, wherein the at least one laser is a pump laser used to couple in energy to generate and maintain the oscillations in the at least two propagation paths formed by the at least one fiberglass ring.

5. The device according to claim 1, wherein the at least two propagation paths are spatially separated from each other.

6. The device according to claim 1, wherein the at least two propagation paths are separated from each other by using varying polarizations for the oscillations of the optical variable.

7. The device according to claim 1, further comprises:

an annular laser/maser with at least two superposed similar closed propagation paths with oscillations of a same frequency and a rotational path of identical length relative to a natural oscillation, and a component with a non-isotropic transparency for sufficiently suppressing one of two directions of propagation for the natural oscillations on each of the at least two closed propagation paths to achieve an opposite direction of propagation for the natural oscillations on the at least two closed propagation paths.

* * * * *